United States Patent
Suzuki et al.

[11] Patent Number: 5,910,189
[45] Date of Patent: Jun. 8, 1999

[54] LIQUID LEVEL SENSOR

[75] Inventors: Kotaro Suzuki, Nishinomiya; Kikuo Kainou, Hirakata, both of Japan

[73] Assignee: Matsushita Electric Industrial Co., Ltd., Osaka, Japan

[21] Appl. No.: 08/945,883

[22] PCT Filed: Mar. 19, 1997

[86] PCT No.: PCT/JP97/00942

§ 371 Date: Feb. 12, 1998

§ 102(e) Date: Feb. 12, 1998

[87] PCT Pub. No.: WO97/36153

PCT Pub. Date: Oct. 2, 1997

[30] Foreign Application Priority Data

Mar. 28, 1996 [JP] Japan .................................. 8-073521
Feb. 20, 1997 [JP] Japan .................................. 9-035858

[51] Int. Cl.⁶ ............................. G09F 23/24; H01C 1/02; G01K 7/22

[52] U.S. Cl. ............................. 73/295; 338/226; 338/229; 374/185

[58] Field of Search .............................. 338/28, 30, 226, 338/229; 73/295; 374/185; 340/622

[56] References Cited

U.S. PATENT DOCUMENTS

| | | | |
|---|---|---|---|
| 3,044,296 | 7/1962 | Boddy | 338/28 X |
| 3,890,588 | 6/1975 | Kanaya et al. | 338/28 |
| 3,918,018 | 11/1975 | Tuley et al. | 338/28 |
| 3,919,680 | 11/1975 | Ueno et al. | 338/28 |
| 4,065,760 | 12/1977 | Feldon | 338/28 X |
| 4,318,073 | 3/1982 | Rossler, Jr. et al. | 338/28 |

FOREIGN PATENT DOCUMENTS

| | | | |
|---|---|---|---|
| 57-88033 | 11/1980 | Japan . | |
| 59-166817 | 9/1984 | Japan . | |
| 96416 | 5/1986 | Japan | 73/295 |
| 64-23130 | 1/1989 | Japan . | |
| 266235 | 10/1990 | Japan | 73/295 |
| 5-99725 | 4/1993 | Japan . | |

*Primary Examiner*—George Dombroske
*Assistant Examiner*—Willie Morris Worth
*Attorney, Agent, or Firm*—McDermott, Will & Emery

[57] ABSTRACT

It is aimed to present a liquid level detector that can be assembled by simply stacking component parts one upon another, without using any soldering work at all. In the liquid level detector, a thermistor (7) is placed on an electrode (2a) of element holder (2) and is pressed by an electrode (3a) of a terminal (3), a coil spring (4) is inserted around the terminal (3) for the electrode (3a) to press the thermistor (7). An insulator (5), with which a terminal member (6) is calked together in advance, is placed to a fitting portion (2c) of the element holder (2), and then the entire assembly is inserted from the opening into a metal case (1), so that the opening is closed with the insulator (5) calked by a fitting portion (1a) of case (1) and the fitting portion (2c) of element holder (2) aligned to an indention (5c) of insulator (5).

7 Claims, 5 Drawing Sheets

LIQUID LEVEL SENSOR

TECHNICAL FIELD

The present invention is related to a liquid level detector for detecting the changing level of liquid.

BACKGROUND OF THE INVENTION

Liquid level detectors have widely been used in various liquid tanks, for example, in an automobile for detecting the changing level of fuel in a tank.

A conventional liquid level detector is comprised of a cylinder-shaped thermistor having electrodes at both ends, provided with metal caps at both ends, each of the caps being connected with a lead wire, the entire structure being stored in a cylindrical metal case, the lead wires being taken out of the metal case from both ends. The changing level of a liquid is detected by applying a voltage to the thermistor and reading a change in the resistance of the thermistor caused by shift in the height of a liquid level.

A problem in the above described structure is that a cap has to be thrusted to cover an electrode of thermistor for taking out a lead wire, and the lead wire has to be soldered to a metal case; these brings about a complication in assembly process.

DISCLOSURE OF THE INVENTION

The present invention is intended to present a liquid level detector which does not require any soldering process in the assembly and the assembly work therefor is easy.

A liquid level detector according to the present invention comprises an open metal case with a bottom having at least one through hole, an element holder stored in the metal case, a thermistor having electrodes at both ends and seated on the element holder, a terminal electrically coupled in one end with the thermistor, a coil spring disposed around the terminal for fixing the terminal, a terminal member electrically coupled with the other end of said terminal, and an insulator having at least one through hole, for holding the terminal member as well as for closing the opening of said metal case.

DESCRIPTION OF THE PREFERRED EMBODIMENTS

In the following, embodiments of a liquid level detector according to the present invention will be described in detail with reference to drawings.

(Embodiment 1)

In a liquid level detector according to a first embodiment of the present invention as shown in FIG. 1 through FIG. 4, a cylinder-shaped metal case 1 is made of brass plated with Ni for anticorrosion, having a bottom, and at the opening edge of which case a fitting portion 1a is provided. In addition, the metal case 1 is provided with three through holes(not shown) in the bottom on a concentric circle at an equal spacing, so as liquids can freely flow in and out the metal case 1. At least one such through hole may suffice, and, such hole may be disposed in the side wall of metal case 1.

Figure 1:
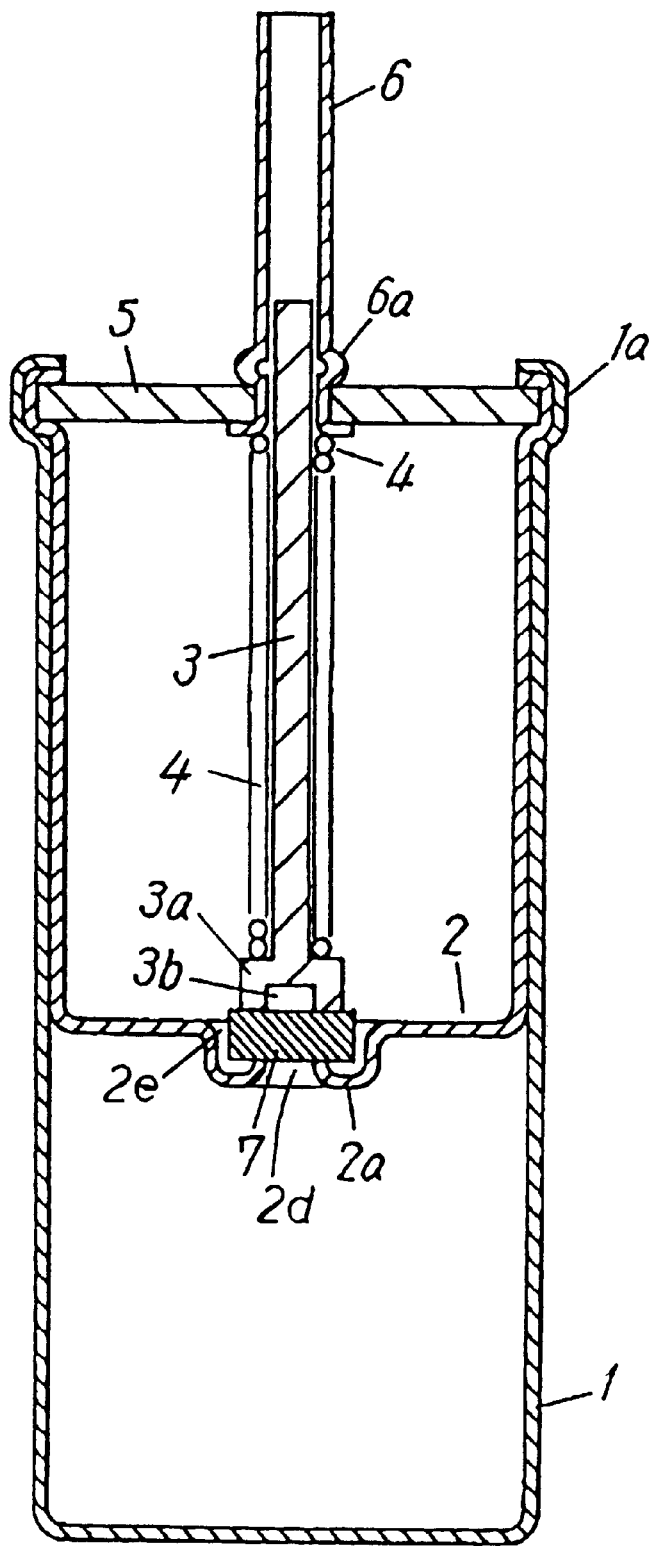
FIG. 1 is a cross sectional view of a liquid level detector according to a first embodiment of the present invention.
Figure 2:
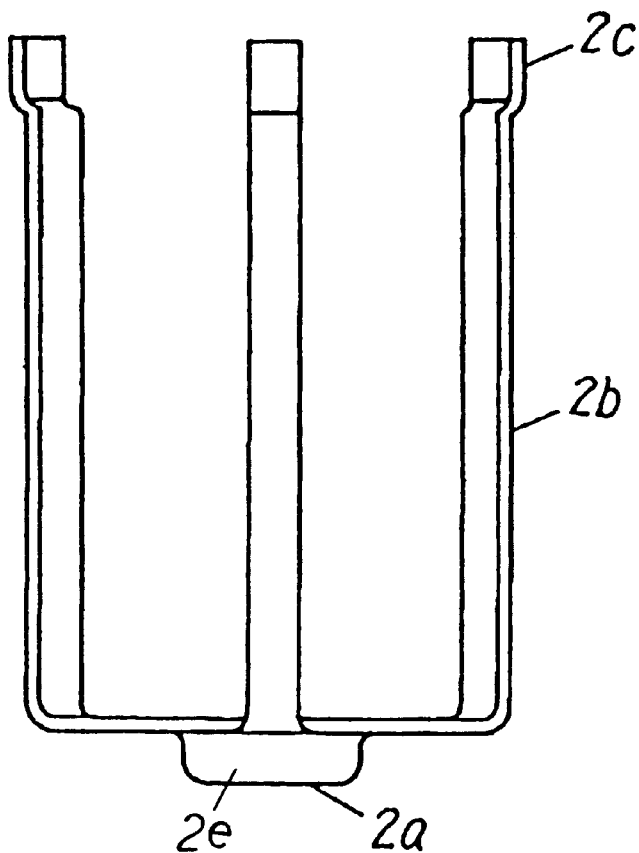
FIG. 2 is a side view of an element holder used in the liquid level detector of FIG. 1.
Figure 3:
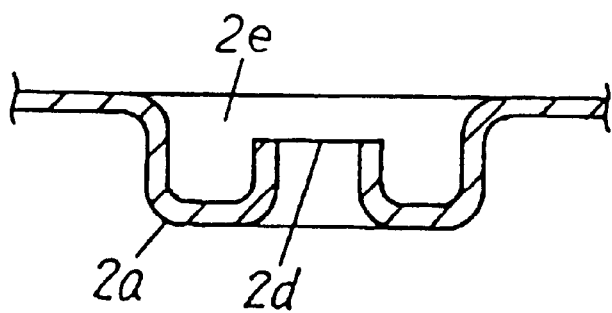
FIG. 3 is a cross sectional view of the element holder in the bottom portion.
Figure 4:
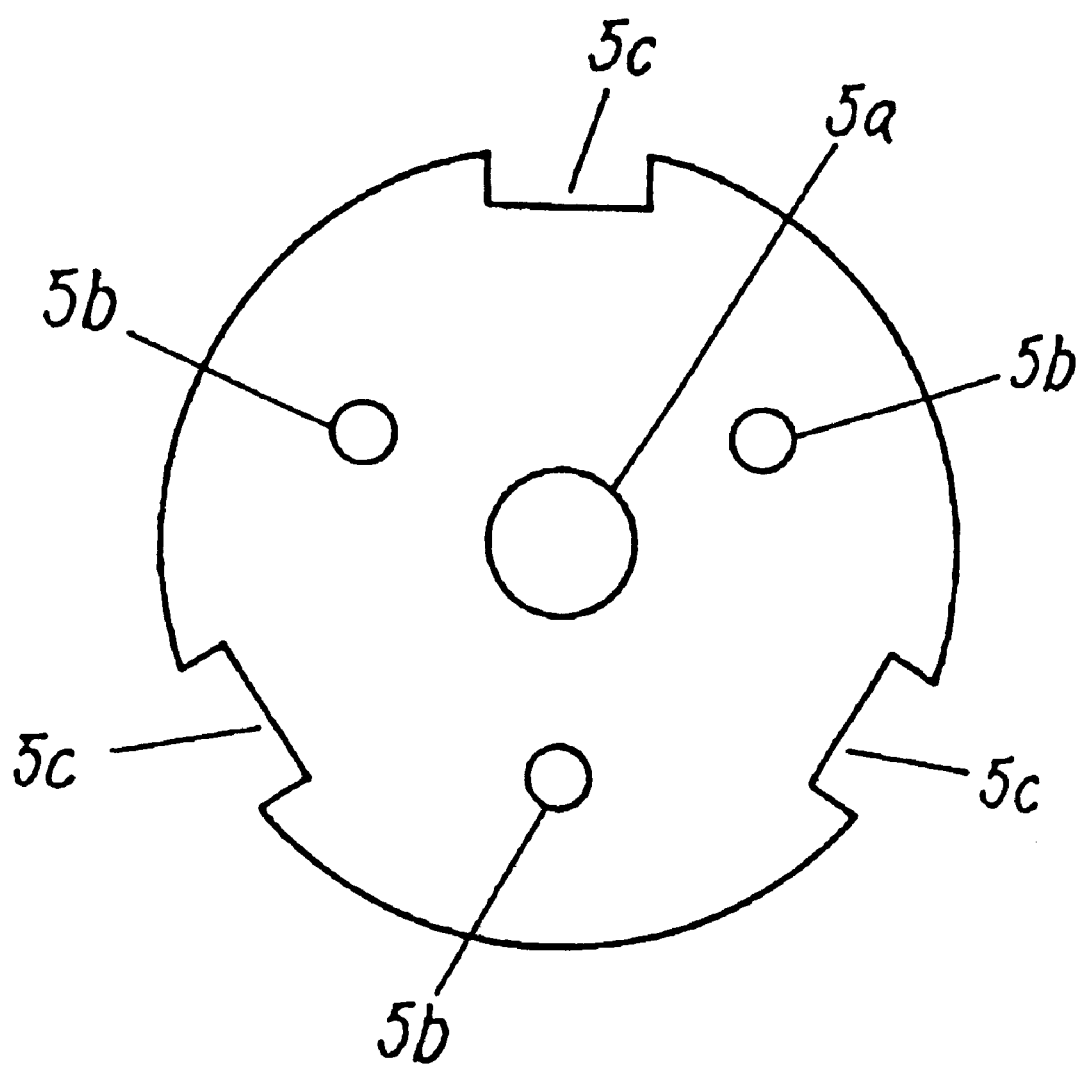
FIG. 4 is a plane view of an insulator used in the liquid level detector of FIG. 1.

An element holder 2 is made of a metal having low thermal conductivity and anticorrosion property, such as a stainless steel, and comprises an electrode 2a to accept thermistor 7 and a foot(supporting portion) 2b. The foot 2b is provided with a fitting portion 2c. The electrode 2a is formed in a counter-position to an electrode 3a of terminal 3 after assembly. The electrode 2a is provided with a protrusion at the bottom for ensuring a good contact with an electrode surface of thermistor 7, as well as a small through hole 2d in the centre of protrusion, the diameter of which hole being smaller than thermistor 7, to assure a good dripping of liquid, as shown in FIG. 3. Around the electrode 2a, a hollow (storage portion) 2e which is larger than thermistor 7 is provided for stably fixing thermistor 7 with the side-wise move of thermistor 7 restricted by the hollow 2e. The foot 2b is provided in three pieces, stretching in parallel along the inner wall of case 1, by which feet the electrode 2a is positioned to a specific location. More than two pieces of foot 2b may suffice for determining a location. The dissipation of heat generated by thermistor 7 may be minimized by making the surface area of foot 2b the smallest.

Terminal 3 is a metal rod, such as a stainless steel, provided with an electrode 3a in one end and the other end of which rod is inserted to terminal member 6. The electrode 3a has a diameter larger than that of other portion of terminal 3, at the same time works as a receptacle of a spring 4. At the centre of electrode 3a is a dent 3b, for improving the contact with another one of the electrode surfaces of thermistor 7.

Spring 4 is a metal coil such as a stainless steel, which is inserted along the rod portion of terminal 3 and is fixed between electrode 3a and insulator 5 for pressing the terminal 3 against thermistor 7.

Insulator 5 is made of a solvent-resistive insulating material such as a phenolic resin, and is provided with a hole 5a in the centre for accepting terminal member 6. In the flat part of insulator 5, an aperture 5b is provided for three on a concentric circle at an equal spacing for allowing liquids comming in and out. At least one aperture 5b may suffice; but the above described form allows liquids flowing in and out the metal case irrespective of installing position. In the circumference, three indentions 5c are provided corresponding to the fitting portion 1a of metal case 1 and the fitting portion of element holder 2c. The number of indentions 5c should preferably be the same as that of fitting portions 1a and fitting portions 2c. The insulator 5 is fixed to the opening of metal case 1 by simultaneously calking the fitting portions 1a and fitting portions 2c to the indentions 5c. This covers the opening of metal case 1 closed.

Terminal member 6 is a metal pipe, such as brass, having a bump 6a at a place close to an end which is to be inserted to insulator 5. After being inserted to hole 5a of insulator 5, the terminal member 6 is positioned by bump 6a and calked to be fixed. Terminal 3 is inserted to terminal member 6 at the end fixed to insulator 5. Terminal member 6 works as a terminal for connection with the outside, making a pair with the metal case 1. Terminal member 6 should preferably be made of a metal having good solderability, for a later soldering when installing the liquid level detector in a specified location.

For assembling a liquid level detector; thermistor 7 is placed in electrode 2a of element holder 2, terminal 3 and spring 4 are put on it in the order, and then insulator 5, with which a terminal member 6 is attached together in advance, is placed, the entire components are inserted into metal case 1 from the opening, and then fitting portion 1a of metal case 1 and fitting portion 2c of element holder 2 are calked together in the indention 5c of insulator 5 to complete the assembly. As described above, no soldering is needed in assembling a liquid level detector, making the whole assembly process simple.

Furthermore, the metal case 1 of the present embodiment plays a role of an anti-explosion casing, in addition to working as a terminal of thermistor 7.

In order to minimize the heat dissipation from a heat generating thermistor, element holder 2, terminal 3 and spring 4 should preferably be designed to have a smallest contact area and manufactured with a low thermal conductivity metal having anticorrosion property, such as a stainless steel.

For obtaining a good response, thermistor 7 should preferably be placed at the center of metal case 1.

(Embodiment 2)

Figure 5:
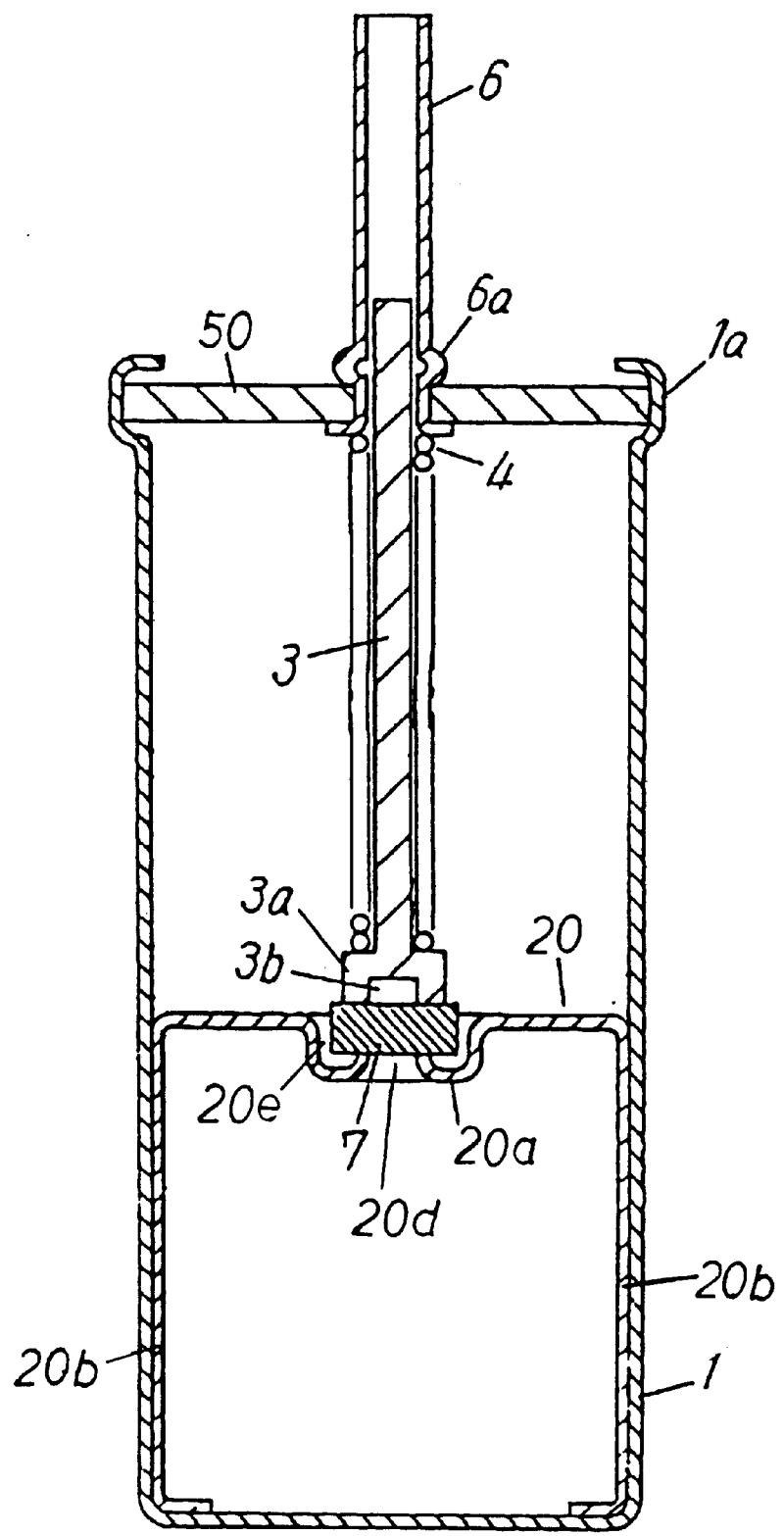
FIG. 5 is a cross sectional view of a liquid level detector according to a second embodiment of the present invention.
Figure 6:
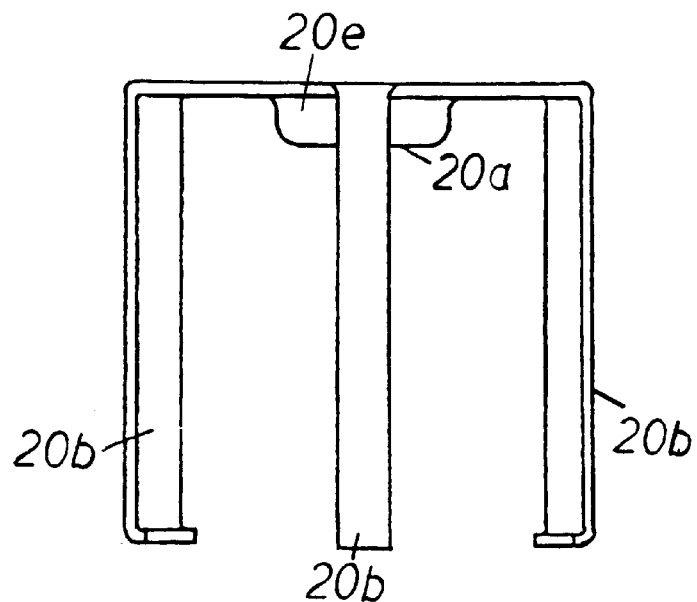
FIG. 6 is a cross sectional view of an element holder used in the liquid level detector of FIG. 5.

A second embodiment of the present invention will be described in the following with reference to FIG. 5 through FIG. 7. Those constituent components having the same function as in Embodiment 1 are identified with the same symbols, and description on which is omitted here.

An element holder 20 of the present embodiment is made of a stainless steel like in the case of Embodiment 1, and is provided with an electrode 20a and a foot 20b for supporting the electrode. The electrode 20a comes at a counter-position to the electrode 3a of terminal 3 after assembly. Electrode 20a has the same structure as that of element holder 2 of Embodiment 1; having a protrusion in the bottom for ensuring a good contact with thermistor 7, having a small through hole 20d, the diameter of which being smaller than thermistor 7, in the centre of the protrusion for assuring a good dripping of liquids. Further, a hollow 20e greater than thermistor 7 is provided around the electrode 20a; the side-wise move of thermistor 7 is restricted by the hollow 20e and the thermistor 7 is stably held in a specified place. A foot 20b is provided in three pieces, extending in parallel along the inner wall of case 1 towards the bottom of case 1. This positions the electrode 20a at a specified location. At least two of foot 20b may suffice for the positioning. Heat dissipation from a heat generating thermistor 7 may be minimized by making the surface area the smallest.

Figure 7:
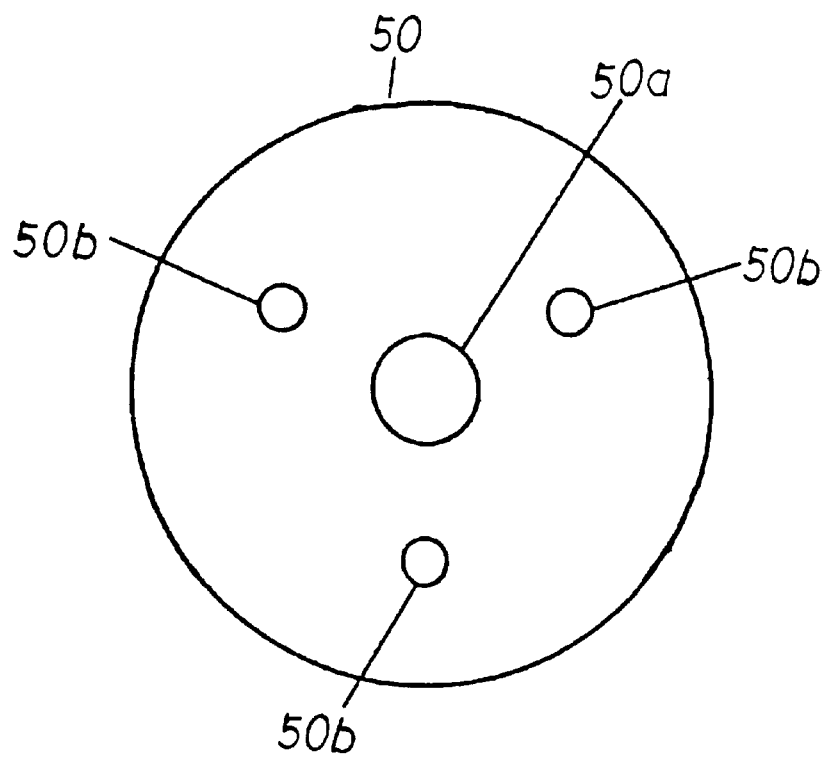
FIG. 7 is a plane view of an insulator used in the liquid level detector of FIG. 5.

An insulator 50 is made of a solvent-resistive insulation material, such as a phenolic resin, and is provided with a hole 50a in the centre for accepting the terminal member 6, as shown in FIG. 7. In the flat part of insulator 50, an aperture 50b is provided for three on a concentric circle at an equal spacing for allowing liquids comming in and out. At least one aperture 50b may suffice; but the above described form allows liquids flowing in and out the metal case 1 irrespective of installing position. The insulator 50 is fixed to the opening of metal case 1 by calking the fitting portion 1a, this at the same time covers the opening of metal case 1 closed.

For assembling a liquid level detector; element holder 20 is inserted in metal case 1, thermistor 7 is placed in electrode 20a of element holder 20, terminal 3 and spring 4 are put on it in the order, and then insulator 50, with which a terminal member 6 is attached together in advance, is placed, the insulator 50 is aligned to the fitting portion 1a of metal case 1 for calking, which completes the assembly. As described above, no soldering is needed in assembling a liquid level detector in the present embodiment either, making the whole assembly process simple.

Furthermore, the metal case 1 of the present embodiment also plays a role of an anti-explosion casing, in addition to working as a terminal of thermistor 7.

In order to minimize the heat dissipation from a heat generating thermistor 7, element holder 20, terminal 3 and spring 4 should preferably be designed to have a smallest contact area and manufactured with a low thermal conductivity metal having anti corrosion property, such as a stainless steel.

For obtaining a good response, thermistor 7 should preferably be placed at the centre of metal case 1.

INDUSTRIAL APPLICABILITY

A liquid level detector according to the present invention is assembled by simply stacking component parts one upon another, during which no soldering work is needed at all. Consequently, the manufacturing efficiency is improved and the number of process steps is minimized. The effectiveness of the present invention in the industry is significant in enabling to present liquid level detectors at an inexpensive cost.

We claim:

1. A liquid level detector comprising:
   a metal case with an upper opening and a bottom having at least one through hole enabling the liquid to freely flow in and out of the metal case;
   an element holder stored in the metal case;
   a thermistor having an electrode at opposing ends and placed on the element holder, a voltage being applied to said thermistor during detecting of said liquid level;
   a terminal electrically coupled at one end with the thermistor;
   a coil spring surrounding the terminal, for fixing the terminal to said thermistor;
   a terminal member electrically coupled at one end with the other end of said terminal; and
   an insulator at the upper opening for closing the upper opening of said metal case and including an aperture for holding the terminal member, wherein
   during application of said voltage to said thermistor, a shift in height of said liquid level changes a resistance of said thermistor.

2. The liquid level detector of claim 1,
   wherein said one end of said terminal electrically coupled with said thermistor includes a dent for improving contact with said thermistor.

3. The liquid level detector of claim 1,
   wherein said element holder comprises:
   an electrode electrically coupled with said thermistor;
   a hollow larger than said thermistor for storing said thermistor; and
   a foot for positioning said electrode at a specific location in said case.

4. The liquid level detector of claim 3, wherein said hollow is provided with at least one through hole whose size is smaller than said thermistor.

5. The liquid level detector of claim 3, wherein said hollow is provided with a protrusion.

6. The liquid level detector of claim 1, wherein said element holder, said coil spring and said terminal are formed with a stainless steel.

7. The liquid level detector of claim 1, wherein the bottom of said metal case and said insulator are provided each with three through holes disposed on a concentric circle at an equal spacing.

* * * * *